(12) United States Patent
Van Handel et al.

(10) Patent No.: US 6,723,204 B2
(45) Date of Patent: Apr. 20, 2004

(54) PROCESS FOR INCREASING THE DRY STRENGTH OF PAPER

(75) Inventors: Joseph Donald Van Handel, Plover, WI (US); Constance K. Klaisner, Oshkosh, WI (US); John C. Gast, Hockessin, DE (US)

(73) Assignee: Hercules Incorporated, Wilmington, DE (US)

( * ) Notice: Subject to any disclaimer, the term of this patent is extended or adjusted under 35 U.S.C. 154(b) by 17 days.

(21) Appl. No.: 10/118,384

(22) Filed: Apr. 8, 2002

(65) Prior Publication Data

US 2003/0188840 A1 Oct. 9, 2003

(51) Int. Cl.[7] .................... D21H 21/20; D21H 17/29; D21H 17/56; D21H 23/04
(52) U.S. Cl. ............... 162/183; 162/168.3; 162/164.1; 162/164.6; 162/175
(58) Field of Search ................ 162/175, 183, 162/135, 164.1–168.7, 158, 178

(56) References Cited

U.S. PATENT DOCUMENTS

| | | | | |
|---|---|---|---|---|
| 3,384,536 A | * | 5/1968 | Sandberg et al. | 162/175 |
| 4,388,150 A | * | 6/1983 | Sunden et al. | 162/175 |
| 4,643,801 A | * | 2/1987 | Johnson | 162/164.1 |
| 4,710,270 A | * | 12/1987 | Sunden et al. | 162/175 |
| 4,750,974 A | * | 6/1988 | Johnson | 162/164.1 |
| 5,061,346 A | | 10/1991 | Taggart et al. | 162/175 |
| 5,085,736 A | * | 2/1992 | Bjorkquist | 162/168.2 |
| 5,167,766 A | * | 12/1992 | Honig et al. | 162/164.1 |
| 5,221,435 A | * | 6/1993 | Smith, Jr. | 162/164.1 |
| 5,316,623 A | | 5/1994 | Espy | 162/164.3 |
| 5,318,669 A | | 6/1994 | Dasgupta | 162/164.3 |
| 5,338,406 A | | 8/1994 | Smith | 162/168.2 |
| 5,338,407 A | | 8/1994 | Dasgupta | 162/168.3 |
| 5,382,324 A | * | 1/1995 | Fischer et al. | 162/168.2 |
| 5,431,783 A | * | 7/1995 | Honig | 162/164.1 |
| 5,543,446 A | * | 8/1996 | Rodriguez | 524/52 |
| 5,633,300 A | | 5/1997 | Dasgupta | 524/55 |
| 5,837,100 A | * | 11/1998 | Gerli et al. | 162/168.2 |
| 5,942,086 A | * | 8/1999 | Owen | 162/135 |
| 6,033,525 A | * | 3/2000 | Moffett | 162/175 |
| 6,168,686 B1 | * | 1/2001 | Sutman et al. | 162/142 |
| 6,228,217 B1 | | 5/2001 | Dickerson et al. | 162/158 |
| 6,238,520 B1 | * | 5/2001 | Greenwood | 162/164.1 |
| 6,294,645 B1 | | 9/2001 | Allen et al. | 528/339.3 |
| 6,379,497 B1 | * | 4/2002 | Sandstrom et al. | 162/123 |

FOREIGN PATENT DOCUMENTS

| | | |
|---|---|---|
| WO | 98 06898 | 2/1998 |
| WO | 01 77437 | 10/2001 |

* cited by examiner

*Primary Examiner*—José A. Fortuna
(74) *Attorney, Agent, or Firm*—Gary M. Samuels

(57) ABSTRACT

Addition of a premixed aqueous mixture of anionic dry strength resin and cationic or amphoteric starch to a paper making pulp slurry yields paper with higher dry strength than paper that is the same except that the starch and dry strength resin are added separately.

15 Claims, No Drawings

PROCESS FOR INCREASING THE DRY STRENGTH OF PAPER

FIELD OF THE INVENTION

This invention relates to processes for increasing the dry strength of paper using mixtures of anionic dry strength resin and cationic or amphoteric starch.

BACKGROUND OF THE INVENTION

In paper-making processes, starch is frequently added to the pulp fiber slurry prior to the sheet forming operation to increase the final strength, particularly dry strength of the paper or paperboard. The starch can be added as an unmodified, uncooked slurry. However, addition in this form usually results in poor retention of the starch in the paper, incomplete swelling of the starch granules and concomitant low strength development. Therefore, most starch added to paper-making pulp slurries is cationic starch, which is generally made cationic by reaction of the starch with a cationic modifier, such as 2,3-epoxypropyltrimethylammonium chloride. The cationically modified starch is cooked to put it into solution and delivered as a high solids (15–30%) solution to the paper mill. In other cases the cationically modified starch is delivered as a dry powder and cooked at the paper mill site to make a low solids (0.5–4.0%) solution, which is then added to the pulp slurry. The cationic starch molecules can adhere to the naturally anionic pulp fibers by electrostatic attraction and thus be retained in the wet fiber mat and remain in the final paper.

There are two major problems with cationically modified starches as additives to paper-making pulp slurries. The first is that the cationic starch molecules can overwhelm the anionic charge on the cellulose fibers, thus setting a limit on the amount of cationic starch which can be added to the slurry. If too much cationic starch is added and the pulp fibers became cationic, only a portion of the starch which is added will be retained in the sheet. The rest will circulate in the paper machine white water system and cause problems such as foam, deposits on the paper-making machinery and filling of the felts that are used to press the water out of the wet fiber mat. In addition, there will be no additional strength benefit in the finished paper from the extra starch which is added, because it is not retained in the sheet.

A second problems is that fibers which have been made cationic by excessive cationic starch addition, will not be able to adsorb other cationic additives which are commonly added the to the pulp slurry, such as sizing agents, cationic dyes, cationic pitch and stickies fixatives, wet strength resins, synthetic dry strength resins and cationic retention and drainage aids. Because of this problem, there is an upper limit on the amount of starch which can be added. This limit depends on the level of anionicity of the fibers, the cationic charge density of the starch, and the amount and type of other cationic additives. This limit is typically between about 0.5 wt. % and 2.5 wt. % starch on a dry basis, based on the weight of the dry pulp fiber. In order to overcome this problem, starch manufacturers have introduced amphoteric (containing both cationic and anionic functional groups) starches. It has been found that in order for the amphoteric starch to be effectively retained it must still contain a net cationic charge. Thus the upper limit on the amount of amphoteric starch which can be added before encountering the problems enumerated above is higher than for straight cationic starches, but a limit still exists, because of the net cationic charge on the amphoteric starches. In addition, amphoteric starches are more difficult to manufacture and more expensive than cationic starches.

Another class of paper strength additives which can be added to the pulp fiber slurry is anionic polyacrylamide resins. The most commercially successful are reaction products of acrylic acid with acrylamide to from a linear acrylamide chain with anionic carboxylic acid side groups. These products can also be cross linked by reaction with a cross linking agent such as, for example, methylene bisacrylamide. These anionic dry strength agents are very poorly retained in the fiber slurry unless a separate addition of a highly cationic additive is also made to the pulp slurry. Typical cationic additives are, for example, polydiallyldimethylammonium chloride, dimethylamine/epichlorohydrin resins, epichlorohydrin/polyamidoamine resins, and polyethyleneimine. Aluminum compounds such as alum or polyaluminum chloride can also be used to retain anionic dry strength additives, but are normally only useful if the paper-making pH is lower than 6.0 and preferably lower than 4.5. Cationic starch has also been tried as a retention aid for anionic dry strength agents, but has not proven very effective.

It is generally believed that in order to effectively retain an anionic dry strength agent, the cationic fixative must have a high cationic charge density, so as to put a localized spot of very high cationic charge on the surfaces of the fibers as an attachment site for the anionic dry strength additive. Cationic or net cationic amphoteric starches typically have cationic charge densities of between 0.10 and 0.5 milliequivalents per gram dry basis and typically 0.20 milliequivalents per gram dry basis. This is much lower than the charge density of synthetic cationic fixatives which have charge densities of 1.8 to 20.0 milliequivalents per gram dry basis and typically 6.0 milliequivalents per gram dry basis. Aluminum compounds also display high cationic charge densities under appropriate acid condition, although this is difficult to measures because of the instability of these compounds in water. It is common practice to add the cationic fixative to the fiber slurry first, such as in the machine chest (last high consistency chest before the paper slurry is diluted with paper-making white water dilution), or to the pump feeding the slurry from the machine chest or to the stuff box (pressure leveling box) prior to the high consistency stock slurry being diluted with paper machine white water. The anionic dry strength agent is then added to the stock slurry at a later point in the system, separated form the cationic fixative by a point of mixing such as the machine chest stock pump, the primary cleaner pump or the fan pump. Additional points for the anionic dry strength resin include all the addition points mentioned above and in a addition a point ahead of the basis weight control valve, the suction of the primary cleaner pump, the suction of the fan pump and points before or after the primary machine screen.

There are several problems that can arise involving the use of anionic dry strength agent and cationic fixative. First, the ratio of the two must be carefully controlled. If an excess of anionic dry strength agent is added, it is poorly retained and the excess builds up in the white water loop of the paper machine causing foam and deposits. If too much cationic fixative is added, it can over cationize the fibers and hurt retention of all additives. Second, changes in the quality of the pulp slurry, the pH of the paper machine system, the ratios of various types of paper-making fibers, will all affect the optimum ratio of the cationic fixative to anionic dry strength resin. Third, the determination of the proper ratio of fixative to anionic dry strength resin must be made using sophisticated test equipment such as a streaming current detector or zeta potential meter, both of which are sensitive laboratory instruments, subject to operator error and not entirely suitable for control of an industrial processes. Fourth, the addition point of the anionic dry strength resin and the cationic fixative must be carefully selected so as not to interfere with or be interfered by the addition of other cationic and anionic additives in the stock slurry stream. In addition if the cationic fixative is added close to he addition point of inorganic filler added to the stock slurry the filler particles will adsorb the fixative and tie it up.

SUMMARY OF THE INVENTION

This invention is a process for making paper with improved dry strength comprising: a) adding to an aqueous paper pulp slurry a premixed aqueous mixture of anionic dry strength resin and cationic starch or amphoteric starch having a net cationic charge, wherein the ratio of the dry strength resin to cationic or amphoteric starch is such that the aqueous mixture has a net cationic charge, and b) sheeting and drying the treated pulp slurry to form paper. Paper produced by the process may have a higher dry strength than paper that is the same except that the anionic dry strength resin and cationic, or amphoteric starch are added separately.

DETAILED DESCRIPTION OF THE INVENTION

This invention is an improvement over conventional practice for incorporating dry strength resin into paper, the improvement being the addition of premixed anionic dry strength resin and cationic or amphoteric starch having a net cationic charge. The invention has a variety of advantages over separate addition of the starch and dry strength resin.

First, the dry strength developed is generally higher with the use of the commixture than it is when the additives are added separately to the pulp slurry in the same amounts. Second, the net cationic charge ensures excellent retention of both additives and prevents the problems associated with unwanted build up of either additive in the paper machine system. Third, there is no need to add a separate cationic fixative which adds cost and complexity to the use of the anionic dry strength resin. Fourth, there is less opportunity for high addition levels of the cationic fixative to cause over cationization of the fibers, and so more starch can be added without causing operating problems. Fifth, more anionic dry strength resin can be added to the paper making system without causing paper machine operating problems. Sixth, since the ideal ratio of anionic dry strength resin to cationic or amphoteric starch need be determined once in the laboratory and these additives are always added to the paper machine in the same ratio, there is no need for constant monitoring of the charge of the paper fiber slurry as there is in the case when the anionic dry strength resin is used with a cationic fixative. Seventh, since there is only one additive stream being added to the paper stock slurry steam, there are fewer constraints on where the commixture is added than there are when two different oppositely charged additives are being added separately. Eighth, since there is less chance of over cationizing the fibers with starch cationic starch when it is commixed with anionic dry strength resin, a less expensive straight cationic starch can be employed instead of more expensive amphoteric starch.

The invention described herein can be applied to processes for making any type of paper or paper board using any type of paper or paper board making machine. Examples are printing and printing and writing papers, coated papers, publication papers, artist papers, bond and archival papers, super calendered wood-free grades, telephone directory paper, newsprint, text and cover papers, sack paper, gypsum paper, bristols, tag and file folder, linerboard, corrugating medium, coated unbleached and bleached kraft boards, recycled coated and uncoated boxboards, core stock, mat board, molded pulp products, ceiling tile, insulation board, and ceiling tile. All these grades can benefit by having higher strength development and are made using a wet forming process in which a fibrous slurry is formed into a mat.

Any of the usual pulp fibers used in manufacturing the above listed grades of paper or paper board may be used in the process of the invention. Typical, but not exclusive examples are bleached and unbleached kraft pulp, bleached and unbleached sulfite pulp, thermomechanical, chemithermomechanical, and mechanical pulps, groundwood pulps, and recycled pulps.

Starches for use in the invention are cationic and amphoteric starches, available by derivatization of any of the readily available starches. Cationic starches are preferred. When amphoteric starch is used, it is necessary that net charge on the starch be positive. Typical but not exclusive examples of starches that can be used in the invention are cationic or amphoteric corn, waxy maize, potato, wheat, tapioca or rice starches. A preferred starch is crosslinked cationic tapioca starch.

Anionic dry strength resins suitable for use in the invention are typically copolymers comprising monomers selected from the group consisting of acrylamide, methacrylamide, acrylic acid, methacrylic acid, sodium-2-acrylamide-2-methylpropane sulfonate. Preferably they are copolymers of acrylamide and acrylic acid and typically have weight average molecular weights of 250,000 to 550,0000 Daltons. They may also be cross-linked to varying extents by incorporation of a crosslinking monomer, such as methylene bis acrylamide. They are sold commercially as dry powders or as water solutions with typical solids contents of 20–22%. The acrylic acid functional groups on these polymers impart an anionic charge in water solution. The anionic charge decreases as the paper making pH is reduced over the range of 8.5 to 3.9 because of protonation of the acrylic acid groups. The anionic charge density at pH 4.0 is typically about 0.7 milliequivalents/gram dry basis and increases to typically around 1.20 milliequivalents/gram dry basis at pH 8.0. A preferred anionic dry strength resin for use in the invention is a copolymer of monomers comprising acrylamide and acrylic acid.

Preparation of the aqueous mixture of cationic or amphoteric starch and dry strength resin can be carried out in a variety of ways. The anionic dry strength resin can be added to the cooked diluted starch in a mix tank with adequate agitation and the mixture pumped to the paper machine, or the anionic dry strength resin can be pumped and metered with a flow meter or metering pump into a stream of diluted cooked starch which is being pumped and metered to the paper machine, followed by an in-line starch or dynamic mixer. The in-line mixer can be a simple as piping which contains adequate elbows, tee's or line length to ensure adequate mixing. There is no requirement for an "aging time" for the mixture before it reaches the paper stock addition point. Alternatively, it is also possible to mix the dry starch and dry strength resin in the desired amounts and then prepare an aqueous solution of the mixture.

In the practice of the invention the ratio of cationic or amphoteric starch to anionic dry strength resin will preferably be from about 2:1 to about 40:1, and more preferably from about 5:1 to about 20:1 on a dry basis. Preferably a ratio is selected which results in a mixture with at least a slight cationic charge. The aqueous mixture of starch and anionic dry strength resin will preferably be added to the pulp slurry in an amount such that the level of starch is from about 0.25 wt. % to about 2.25 wt. % of pulp fiber on a dry basis, and more preferably such that the level is from about 0.5 wt. % to 1.5 wt. %. Similarly, the aqueous mixture of starch and anionic dry strength resin will preferably be added to the pulp slurry in an amount such that the level of anionic dry strength resin is from about 0.05 wt. % to about 0.25 wt. % of pulp fiber on a dry basis, and more preferably from about 0.1 wt. % to about 0.2 wt. %.

Procedures

For the paper making examples presented below the paper furnish was a 50:50 blend of hard and soft wood kraft pulps. The machine chest contained the pulp furnish and clay at a level of 10% by weight based on the weight of the dry pulp. Alum at the 0.5% addition level was added at the fan pump inlet. Perform™PC8713 retention aid (available from Hercules Incorporated, Wilmington, Del.) was added at the fan pump outlet at the 0.01% level as a retention aid. Water had a hardness of 50 ppm and an alkalinity of 25 ppm. The stock temperature was 50° C. The system pH was 4.5.

In those examples where mixtures of starch and anionic dry strength resin were utilized, aqueous solutions of the two materials were mixed in a "T-line" feeding the first paper stock mixer. In the comparative examples where starch and anionic dry strength resin were added separately the starch was added at first mixer and the resin at the fourth mixer.

Paper was made at a nominal 40 lbs/ream basis weight. The main section dryer temperature was 80° C.

Paper was test for tensile strength and utilizing Tappi Method T494 om-96, for Scott type internal bond strength using Tappi Method T569 pm-00.

The cationic or anionic charge of a mixture of cationic or amphoteric starch and an anionic polyacrylamide dry strength resin was determined using the Mutek PCD 03 streaming current detector manufactured by Mutek Analytic of Marietta, Ga. The PCD 03 is composed of a closed-bottom cylinder made of poly tetrafluoroethylene, a piston which moves up and down inside the cylinder, and a mechanism for driving the piston. The cylinder was filled with 10 ml of a fluid and the electric drive started. As the piston moves up and down in the cylinder, the fluid is forced to move opposite the motion of the piston. Electrodes near the top and bottom of the cylinder are attached to a electronic circuit which measures a weak alternating electrical potential. The potential is amplified and rectified to produce a millivolt signal output, indicating the charge on the particles dispersed in the fluid. This instrument relies on the fact that the surface of a charged particle in aqueous solution has charges at its surface. Next to the surface is a "stationary" layer or "Stern" layer which is of opposite charge. Next to the stationary layer is the "diffuse" layer of a charge opposite the stationary layer. The motion of the PCD piston sweeps away the diffuse layer and this moving mass of charged particles can be measured by the alternating potential across the electrodes.

After the fluid sample was placed in the instrument and the starting MV potential determined, a titrant of opposite charge was titrated into the fluid sample, while the piston continues to move up and down. The normal cationic titrant was polydiallyldimethyl ammonium chloride (polyDADMAC) and the normal anionic titrant was potassium polyvinyl sulfonic acid (PESNA). The titrant was normally added as a 0.001 N solution. The amount of titrant required to bring the MV potential to zero is determined and the result multiplied by 100 to give the milliequivalents of charge per liter of fluid.

A unit similar in operation to the Mutek is supplied by ChemTrack and is also suitable for use with this invention.

To determine the charge on a starch solution, the cooked starch solution was allowed to cool and placed in the instrument. Since cationic and amphoteric starches used as wet end additives in paper making are cationically charged, the anionic titrant was used to determine the level of the cationic charge. The anionic polyacrylamide dry strength resin was then added to the cationic or amphoteric starch solution and mixed, and then the charge determined on the mixture as described above. This enabled drawing a curve of the cationic charge level versus the ratio of anionic dry strength resin to cationic or amphoteric starch. The amount of anionic dry strength resin employed was such that the resultant mixture displayed a net cationic charge.

Materials

The anionic dry strength resin was Hercobond®2000, a copolymer of acrylamide and acrylic acid, available from Hercules Incorporated, Wilmington, Del.

Amphoteric starch was Cato® 255 and cationic starch Cato® 232, available from National Starch and Chemical Company, Bridgewater, N.J. Both are based on waxy maize starch.

The results of Examples 1–8 and Comparative Examples A–I are presented in Table 1 below. The data clearly demonstrate the improvement in dry strength, particularly Scott type internal bond strength, when the starch and dry strength resin are premixed before addition to the pulp slurry.

TABLE 1

Examples 1–8-Comparative Example A–I

| Example Number | Starch (% Addition Level) | Hercobond 2000 (% Addition Level) | Addition Mode | Basis Weight (lbs/Ream) | Dry Tensile (lbs/inch) | Dry Tensile (lbs/inch) Normalized to 40 lbs/Ream Basis Wt. | Scott Bond (ft-lbs/sq inch × 100) |
|---|---|---|---|---|---|---|---|
| Comparative A | 0 | 0 | | 42.5 | 15.24 | 14.33 | 8.56 |
| Comparative B | Cato 232 (1) | (0.1) | Separate | 41.9 | 18.59 | 17.73 | 9.88 |
| Comparative C | Cato 232 (1) | (0.1) | Separate | 41.8 | 18.85 | 18.03 | 9.71 |
| 1 | Cato 232 (1) | (0.1) | Premixed | 42.7 | 18.95 | 17.77 | 10.61 |
| 2 | Cato 232 (1) | (0.1) | Premixed | 41.8 | 19.26 | 18.43 | 10.45 |
| Comparative D | Cato 232 (1) | (0.2) | Separate | 42.2 | 18.83 | 17.86 | 9.70 |
| Comparative E | Cato 232 (1) | (0.2) | Separate | 42.0 | 19.84 | 18.91 | 9.55 |
| 3 | Cato 232 (1) | (0.2) | Premixed | 42.0 | 19.37 | 18.44 | 10.93 |

TABLE 1-continued

Examples 1–8-Comparative Example A–I

| Example Number | Starch (% Addition Level) | Hercobond 2000 (% Addition Level) | Addition Mode | Basis Weight (lbs/Ream) | Dry Tensile (lbs/inch) | Dry Tensile (lbs/inch) Normalized to 40 lbs/Ream Basis Wt. | Scott Bond (ft-lbs/sq inch × 100) |
|---|---|---|---|---|---|---|---|
| 4 | Cato 232 (1) | (0.2) | Premixed | 42.3 | 19.66 | 18.60 | 10.64 |
| Comparative F | Cato 255 (1) | (0.1) | Separate | 42.7 | 19.06 | 17.86 | 10.26 |
| Comparative G | Cato 255 (1) | (0.1) | Separate | 42.3 | 18.66 | 17.63 | 10.22 |
| 5 | Cato 255 (1) | (0.1) | Premixed | 42.6 | 19.40 | 18.20 | 10.68 |
| 6 | Cato 255 (1) | (0.1) | Premixed | 42.5 | 18.80 | 17.68 | 10.80 |
| Comparative H | Cato 255 (1) | (0.2) | Separate | 42.4 | 19.66 | 18.54 | 9.92 |
| Comparative I | Cato 255 (1) | (0.2) | Separate | 42.6 | 20.31 | 19.06 | 9.94 |
| 7 | Cato 255 (1) | (0.2) | Premixed | 42.3 | 19.54 | 18.50 | 10.92 |
| 8 | Cato 255 (1) | (0.2) | Premixed | 42.4 | 18.74 | 17.69 | 10.86 |

What is claimed is:

1. A process for making paper with improved dry strength comprising:
   a) adding to an aqueous paper pulp slurry an aqueous mixture of anionic dry strength resin and cationic starch or amphoteric starch having a net cationic charge, wherein the ratio of the dry strength resin to cationic or amphoteric starch is such that the aqueous mixture has a net cationic charge, to form a treated pulp slurry wherein the anionic dry strength resin is an anionic polyacrylamide copolymer, and
   b) sheeting and drying the treated pulp slurry to form paper.

2. The process of claim 1 wherein the anionic dry strength resin is a copolymer of monomers selected from the group consisting of acrylamide, methacrylamide, acrylic acid, methacrylic acid, and sodium-2-acrylamide-2-methyl, propane sulfonate, provided one monomer is acrylamide.

3. The process of claim 1 wherein the anionic dry strength resin is a copolymer of monomers comprising acrylamide and acrylic acid.

4. The process of claim 3 wherein the anionic dry strength resin is crosslinked.

5. The process of claim 1 wherein the aqueous mixture is added in an amount such that the level of starch is from about 0.25% wt. % to about 2.25 wt. % of pulp fiber on a dry basis, based on the dry weight of the pulp fiber.

6. The process of claim 1 wherein the aqueous mixture is added in amount such that the level of starch is from about 0.5% wt. % to about 1.5 wt. % of pulp fiber on a dry basis.

7. The process of claim 1 wherein the aqueous mixture is added in an amount such that the level of anionic dry strength resin is from about 0.05 wt. 5 to about 0.25 wt. % of pulp fiber on a dry basis.

8. The process of claim 1 wherein the aqueous mixture is added in an amount such that the level of anionic dry strength resin is from about 0.1 to about 0.2 wt. % of pulp fiber on a dry basis.

9. The process of claim 1 wherein the weight ratio on a dry basis of starch to anionic dry strength resin in the aqueous mixture is from about 2:1 to about 40:1.

10. The process of claim 1 wherein the weight ratio on a dry basis of starch to anionic dry strength resin in the aqueous mixture is from about 5:1 to about 20:1.

11. The process of claim 1 wherein the cationic starch is selected from the group consisting of cationic waxy maize, potato, corn, wheat and tapioca starch.

12. The process of claim 1 wherein the amphoteric starch is selected from the group consisting of amphoteric waxy maize, potato, corn, wheat and tapioca starch.

13. The process of claim 1 wherein anionic dry strength resin is copolymer monomers selected from the group consisting of acrylamide, methacrylamide, acrylic acid, methacrylic acid and sodium-2-acrylamide-2-methylpropane sulfonate, the cationic starch is selected from the group consisting of cationic waxy maize, potato, corn wheat and tapioca starch, and the amphoteric starch is selected from the group consisting of amphoteric waxy maize, potato, corn, wheat and tapioca starch.

14. A process for making paper with improved dry strength comprising:
   (a) providing an aqueous pulp slurry;
   (b) providing an aqueous mixture of anionic dry strength resin and cationic or amphoteric starch having a net cationic charge, wherein the ratio of the dry strength resin to cationic or amphoteric starch is such that the aqueous mixture has a net cationic charge; wherein the anionic dry strength resin is an anionic polyacrylamide copolymer;
   (c) adding the aqueous mixture of step (b) to the aqueous pulp slurry to form a treated pulp slurry; and
   (d) sheeting and drying the treated pulp slurry to form paper.

15. The process of claim 14 wherein the paper has higher dry strength than paper that is the same except that the anionic dry strength resin and cationic or amphoteric starch are added separately to the aqueous pulp slurry.

* * * * *